(12) United States Patent
Bran et al.

(10) Patent No.: US 8,687,848 B2
(45) Date of Patent: Apr. 1, 2014

(54) TECHNIQUES FOR CONTEXT-ENHANCED CONFIDENCE ADJUSTMENT FOR GESTURE

(75) Inventors: Cary Bran, Seattle, WA (US); Ethan Hugg, Lake Forest Park, WA (US); Alan D. Gatzke, Bainbridge Island, WA (US)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 13/343,061

(22) Filed: Jan. 4, 2012

(65) Prior Publication Data

US 2013/0170699 A1 Jul. 4, 2013

(51) Int. Cl.
*G06K 9/00* (2006.01)
*H04N 7/18* (2006.01)

(52) U.S. Cl.
USPC ............... 382/103; 382/291; 348/94

(58) Field of Classification Search
USPC ......... 382/100, 103, 106–107, 123, 154, 162, 382/168, 173, 181, 184, 193, 199, 203, 209, 382/219, 224, 232, 243, 254, 274, 276, 382/285–291, 305, 312; 719/313; 348/14.08, 94
See application file for complete search history.

(56) References Cited

U.S. PATENT DOCUMENTS

| | | | | |
|---|---|---|---|---|
| 8,379,919 | B2 * | 2/2013 | Bronder et al. | 382/103 |
| 2009/0009588 | A1 * | 1/2009 | Shaffer et al. | 348/14.08 |
| 2011/0055846 | A1 * | 3/2011 | Perez et al. | 719/313 |
| 2011/0074911 | A1 * | 3/2011 | Khouri et al. | 348/14.08 |

OTHER PUBLICATIONS

Liu et al., "uWave: Accelerometer-based Personalized Gesture Recognition and its Applications", pp. 1-9, retrieved from the internet on Jan. 4, 2012.

* cited by examiner

*Primary Examiner* — Seyed Azarian
(74) *Attorney, Agent, or Firm* — Edell, Shapiro & Finnan, LLC (57) ABSTRACT

Techniques are provided for a gesture device to detect a series of gestures performed by a user and execute corresponding electronic commands associated with the gestures. The gesture device detects a gesture constituting movements from a user in three-dimensional space and generates a confidence score value for the gesture. The gesture device selects an electronic command associated with the gesture and compares the electronic command with a prior electronic command associated with a prior gesture previously detected by the gesture device in order to determine a compatibility metric between the electronic command and the prior electronic command. The gesture device then adjusts the confidence score value based on the compatibility metric to obtain a modified confidence score value. The electronic command is executed by the gesture device when the modified confidence score value is greater than a predetermined threshold confidence score value.

20 Claims, 8 Drawing Sheets

GESTURE PAIR DATABASE    130

| GESTURE TYPES ⁠—502 | ELECTRONIC COMMAND ⁠—504 | AFFINITY PAIRS ⁠—506 | REPELLENT PAIRS ⁠—508 |
|---|---|---|---|
| GESTURE 1 | ELECTRONIC COMMAND A | 1, 3 | 2, L |
| GESTURE 2 | ELECTRONIC COMMAND B | 1, 4 | 2, N |
| GESTURE 3 | ELECTRONIC COMMAND C | 3, L | 3, 1 |
| ⋮ | ⋮ | 3, P | 3, 2 |
|  |  | L, N | N, L |
| GESTURE L | ELECTRONIC COMMAND X | ⋮ | ⋮ |
| ⋮ | ⋮ |  |  |
| GESTURE N | ELECTRONIC COMMAND Y |  |  |
| ⋮ | ⋮ |  |  |
| GESTURE P | ELECTRONIC COMMAND Z |  |  |

TECHNIQUES FOR CONTEXT-ENHANCED CONFIDENCE ADJUSTMENT FOR GESTURE

TECHNICAL FIELD

The present disclosure relates to gesture detection.

BACKGROUND

Gesture oriented input devices ("gesture devices") are emerging as a mainstream paradigm for controlling electronic devices. A user may interact with a gesture device by performing a motion near the gesture device. For example, a human user may perform a motion or gesture within a two-dimensional plane (e.g., simulating operations performed on a touch screen of the device) or may perform a motion within a three-dimensional space (e.g., by making a hand gesture near the device interface) near the gesture device interface to initiate a particular electronic command. Motions or gestures associated with particular electronic commands, however, may vary between users, as the users may have slight variations in how they perform the motion. Thus, as the adoption of gesture devices increases, problems associated with managing individual variances of gestural input also increase. For example, when playing a game controlled by a gesture device, a user gesture for game moves may often be misinterpreted by the gesture device until the user adapts to the game's gestural syntax. This problem is amplified for gesture devices configured to detect three-dimensional motions.

DESCRIPTION OF EXAMPLE EMBODIMENTS

Overview

Techniques are provided for a gesture device to detect a series of gestures performed by a user and execute corresponding electronic commands associated with the gestures. The gesture device detects a gesture constituting movements from a user in three-dimensional space and generates a confidence score value for the gesture. The gesture device selects an electronic command associated with the gesture and compares the electronic command with a prior electronic command associated with a prior gesture previously detected by the gesture device in order to determine a compatibility metric between the electronic command and the prior electronic command. The gesture device then adjusts the confidence score value based on the compatibility metric to obtain a modified confidence score value. The electronic command is executed by the gesture device when the modified confidence score value is greater than a predetermined threshold confidence score value.

Example Embodiments

Figure 1:
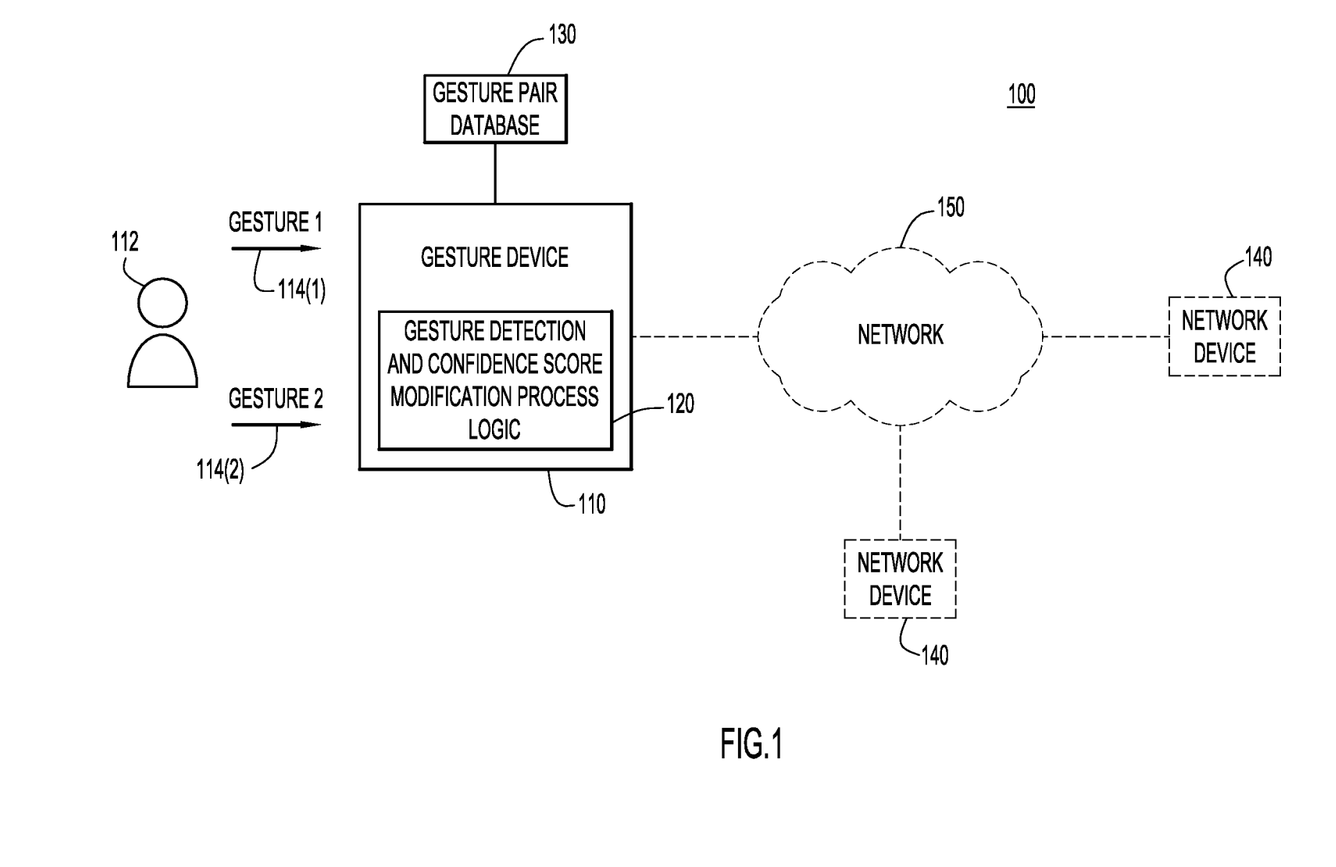
FIG. 1 is an example illustration of an environment comprising a gesture oriented input device (hereinafter "gesture device") that is configured to detect a series of gestures performed by a user and execute corresponding electronic commands associated with the gestures.

FIG. 1 shows an example illustration 100 of an environment comprising a gesture oriented input device (hereinafter "gesture device") 110 configured to detect a series of gestures performed by a user 112. Specifically, the gesture device 110 is configured to detect one or more gestures or motions made by the user 112 relative to the gesture device 110. In one example, the user 112 initiates or makes a first gesture and a second subsequent gesture (shown as "Gesture 1" at reference 114(1) and "Gesture 2" at reference 114(2), respectively), constituting movements in, e.g., three-dimensional space near the gesture device 110. The gesture device 110 may be any one of a computer device, mobile device, tablet device, laptop, etc. enabled with supporting hardware and software to detect gestures from one or more users and to execute electronic commands associated with the gestures.

The gesture device 110 is configured with a gesture detection and confidence score modification process logic, shown at reference numeral 120. The gesture detection and confidence score modification process logic 120, as described by the techniques hereinafter, enables the gesture device 110 to detect the gestures 114(1) and 114(2) from the user 112 and allows the gesture device 110 to execute electronic commands associated with these gestures if it is appropriate to do so.

The gesture device 110 is configured to access a gesture pair database 130. As described according to the details hereinafter, the gesture pair database 130 stores a list of gesture types with corresponding electronic commands and also stores a list of "affinity" gesture pairs and "repellent" gesture pairs. In general, upon detecting one or more gestures from the user 112, the gesture device 110 can access the gesture pair database 130 to determine whether to execute electronic commands associated with the detected gestures. Although the terms "gestures" and "electronic commands" are in plural form, those skilled in the art will appreciate that a single gesture can lead to a single electronic command or multiple electronic commands.

FIG. 1 shows the gesture device 110 optionally coupled to network devices 140 over a network 150. For example, the gesture device 110 may be configured to communicate with the network devices 140, which may also be gesture oriented input devices. Network 140 may be a wide area network or a local area network.

It should be appreciated that though FIG. 1 shows one user 112 initiating two gestures 114(1) and 114(2) with the gesture device 110, any number of users may be able to initiate any number and type of gestures with the gesture device 110. Likewise, the gesture device 110 is configured to detect any number of gestures from any number of users. Additionally, though FIG. 1 shows the gesture pair database 130 residing outside of the gesture device 110, it should be appreciated that the gesture pair database 130 may reside within the gesture device 110 itself (e.g., stored in a memory component of the gesture device 110).

Figure 2:
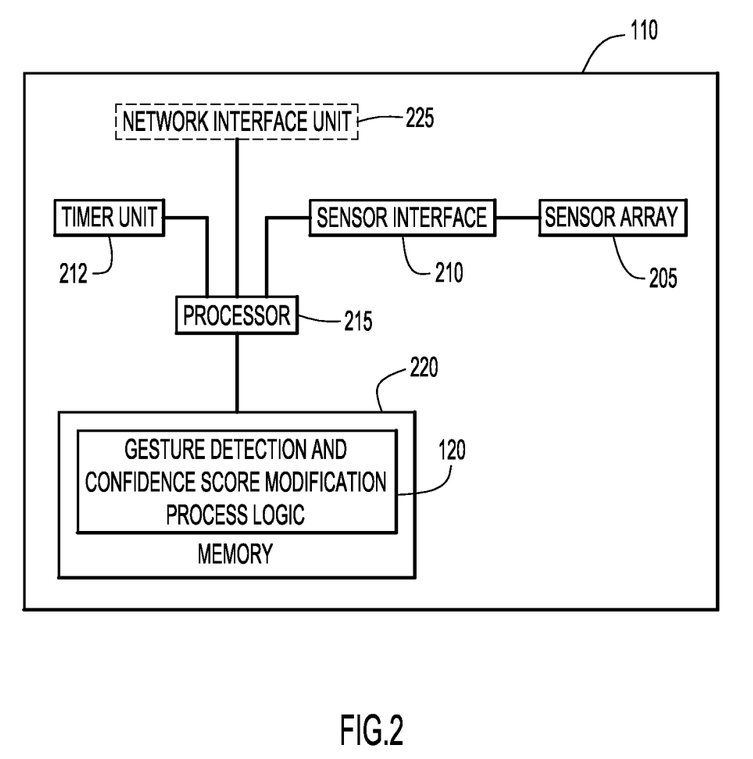
FIG. 2 is an example block diagram of the gesture device configured with gesture detection and confidence score modification process logic to detect a series of gestures by the user and to adjust the confidence score for the detected gestures to execute an electronic command associated with the gestures when appropriate.

Reference is now made to FIG. 2, which shows an example block diagram of the gesture device 110. The gesture device 110 comprises a sensor array 205, a sensor interface 210, a timer unit 212, a processor 215 and a memory 220. The gesture device 110 may also comprise an optional network interface unit 225. The sensor array 205 is an array of sensors that is coupled to the sensor interface 210 and configured to detect orientation and movements (gestures) performed by the user 112 for purposes of generating and executing an electronic command associated with the gestures. For example, the sensor array 205 may reside on a surface of the gesture device 110 to detect gestures or movements made by the user 112 near or in proximity to the surface of the gesture device 110. The sensor array 205 is configured to detect the gestures performed by the user 112 and to convert the gestures into sensor data to be processed by the gesture device 110. In one implementation, the sensor array 205 may comprise a video camera.

The sensor interface 210 is coupled to the sensor array 205 and to the processor 215 and serves as an interface for the sensor data produced by the sensor array 205 to processor 215. In one example, the sensor interface 210 converts the sensor data received from the sensor array 205 to appropriate digital data that is interpreted by the processor 215, for example, to execute corresponding electronic commands associated with the gestures detected by the sensor array 205.

The timer unit 212 is coupled to the processor 215 and, in one example, is configured to measure the amount of time between gesture detection instances. For example, when Gesture 2 114(2) is detected by the gesture device 110 after Gesture 1 114(1) is detected, the timer unit 212 is configured to measure the amount of time between the gesture device 110 detecting Gesture 1 and Gesture 2. The timer unit 212 calculates this time and sends timing data to the processor 215 to be used, for example, to determine whether to execute the corresponding electronic commands associated with the gestures.

The processor 215 is a microprocessor or microcontroller that is configured to execute program logic instructions (i.e., software) for carrying out various operations and tasks described herein. For example, the processor 215 is configured to execute the gesture detection and confidence score modification process logic 120 that is stored in the memory 220 to detect a series of gestures by the user 112 and to execute electronic commands associated with the gestures if appropriate. The functions of the processor 215 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 220 may comprise read only memory (ROM), random access memory (RAM), magnetic disk storage media devices, optical storage media devices, flash memory devices, electrical, optical, or other physical/tangible memory storage devices. The memory 220 stores software instructions for the gesture detection and confidence score modification process logic 120. Thus, in general, the memory 220 may comprise one or more computer readable storage media (e.g., a memory storage device) encoded with software comprising computer executable instructions and when the software is executed (e.g., by the processor 215) it is operable to perform the operations described for the gesture detection and confidence score modification process logic 120.

The gesture detection and confidence score modification process logic 120 may take any of a variety of forms, so as to be encoded in one or more tangible computer readable memory media or storage device for execution, such as fixed logic or programmable logic (e.g., software/computer instructions executed by a processor), and the processor 215 may be an application specific integrated circuit (ASIC) that comprises fixed digital logic, or a combination thereof.

For example, the processor 215 may be embodied by digital logic gates in a fixed or programmable digital logic integrated circuit, which digital logic gates are configured to perform the gesture detection and confidence score modification process logic 120. In general, the gesture detection and confidence score modification process logic 120 may be embodied in one or more computer readable storage media encoded with software comprising computer executable instructions and when the software is executed operable to perform the operations described herein for the process logic 120.

An optional network interface unit 225 is connected to the processor 215. The network interface unit 225 is configured to send and receive communications to and from other network devices 140 across the network 150, as depicted in FIG. 1 above, according to one embodiment. In one example, when the gesture device 110 is configured to interact with the network devices 140 across the network 150, the network interface unit 225 is configured to send data generated by the processor 215 in response to gestures detected by the gesture device 110.

In general, as stated above, the gesture device 110 is configured to detect gestures to initiate or execute an associated electronic command. The gestures constitute movements by the user 112 in, e.g., three-dimensional space near the gesture device 110. For example, if the user 112 makes a "thumbs up" gesture near the gesture device 110, the gesture device 110, upon detecting the "thumbs up" gesture, may initiate an electronic command (e.g., a command to open an application on the gesture device 110) associated with that gesture. It should be appreciated that the "thumbs up" gesture is used simply as an example and that the gesture device 110 may be configured such that any electronic command may be associated with any movement in three-dimensional space by the user 112.

Every time that the gesture device 110 detects a gesture from the user 112, the gesture device 110 will attempt to classify and associate the gesture with a particular electronic command. For example, the gesture device 110 will access the gesture pair database 130 to determine whether the gesture from the user 112 can be interpreted as corresponding to one of the electronic command types stored in the gesture pair database 130.

Often, the gesture device 110 may be quite confident that a detected gesture is intended to correspond to a particular electronic command. At other times, the gesture device 110 may be confident that a detected gesture is intended not to correspond to any particular electronic command. Still, at other times, the gesture device 110 may be unsure as to which electronic command, if any, should be associated with the detected gesture. In this example, the gesture device 110 may select a plurality of electronic commands (e.g., from the gesture pair database 130) potentially to be associated with the gesture. From those electronic commands, the gesture device 110 may select the most appropriate or "best" electronic command (if any) to be associated with the gesture. Thus, in order to determine which electronic command, if any, is appropriate, upon detecting the gesture, the gesture device 110 generates a confidence score for each electronic command that it interprets as possibly being associated with the detected gesture.

The confidence score reflects how certain the gesture device 110 is that the detected gesture is intended to trigger the particular electronic command. The confidence score, for example, may be a number between 0-100 to represent the percent of certainty or confidence of the gesture device 110 for the electronic command. For example, if the gesture device 110 is highly confident that the detected gesture is intended to trigger the particular electronic command, the gesture device 110 will generate a relatively high confidence score for that particular electronic command (e.g., a confidence score of 90). If the gesture device 110 believes that the detected gesture might be intended to trigger a particular electronic command, but is not very confident of that assessment, the gesture device 110 will generate a relatively low confidence score for that particular electronic command (e.g., a confidence score of 60). If the gesture device 110 believes that the detected gesture might be intended to trigger one of several possible electronic commands, the gesture device 110 will generate a confidence score for each of the possible electronic commands. These confidence scores can be modified by the gesture device 110, according to the techniques described hereinafter.

In one example, the gesture device 110 may compare confidence score values associated with electronic commands to threshold confidence score values, and the gesture device 110 will execute the electronic command associated with the confidence score only when the confidence score is above the threshold confidence score value. In the example where the gesture device 110 assigns only one confidence score for one possible electronic command, the gesture device 110 will execute the electronic command if it is above the confidence score value. In the example where the gesture device 110 assigns multiple confidence scores for multiple possible electronic commands, the gesture device 110 may select the electronic command with the highest confidence score that is above the threshold confidence score value.

The gesture device 110 is configured to receive multiple gestures in a sequence or series. For example, the user 112 may perform a first gesture (e.g., Gesture 1 114(1) in FIG. 1) and soon after may perform a second gesture (e.g., Gesture 2 114(2) in FIG. 2). When the gesture device 110 detects multiple gestures, the gesture device 110 can use information from previously detected gestures, as well as the time value between the gestures, to adjust the confidence scores of electronic commands associated with newly received gestures. For example, as described by the embodiments hereinafter, the gesture device 110 may detect a new or current gesture, generate a confidence score of an electronic command associated with the current gesture and compare the electronic command associated with the current gesture to a prior electronic command associated with a prior gesture previously detected by the gesture device 110. Based on this comparison, the gesture device 110 can modify the confidence score of the electronic command associated with the current gesture in order to determine whether to execute this electronic command.

The confidence score of the electronic command associated with the current gesture may, for example, initially be greater than the threshold confidence score value, but after the comparison is performed, this confidence score may be reduced to a value below the threshold confidence score value (and thus, the gesture device 110 will not execute the associated electronic command). Similarly, the confidence score of the electronic command associated with the current gesture may initially be lower than the threshold confidence score value, and after the comparison is performed, the confidence score may be increased to a value above the threshold confidence score value (and thus, the gesture device 110 will execute the associated electronic command). At other times, the comparison between the electronic command associated with the current gesture and the prior electronic command associated with the prior gesture will have little or no effect on the confidence score of the electronic command of the current gesture.

Figure 3A:
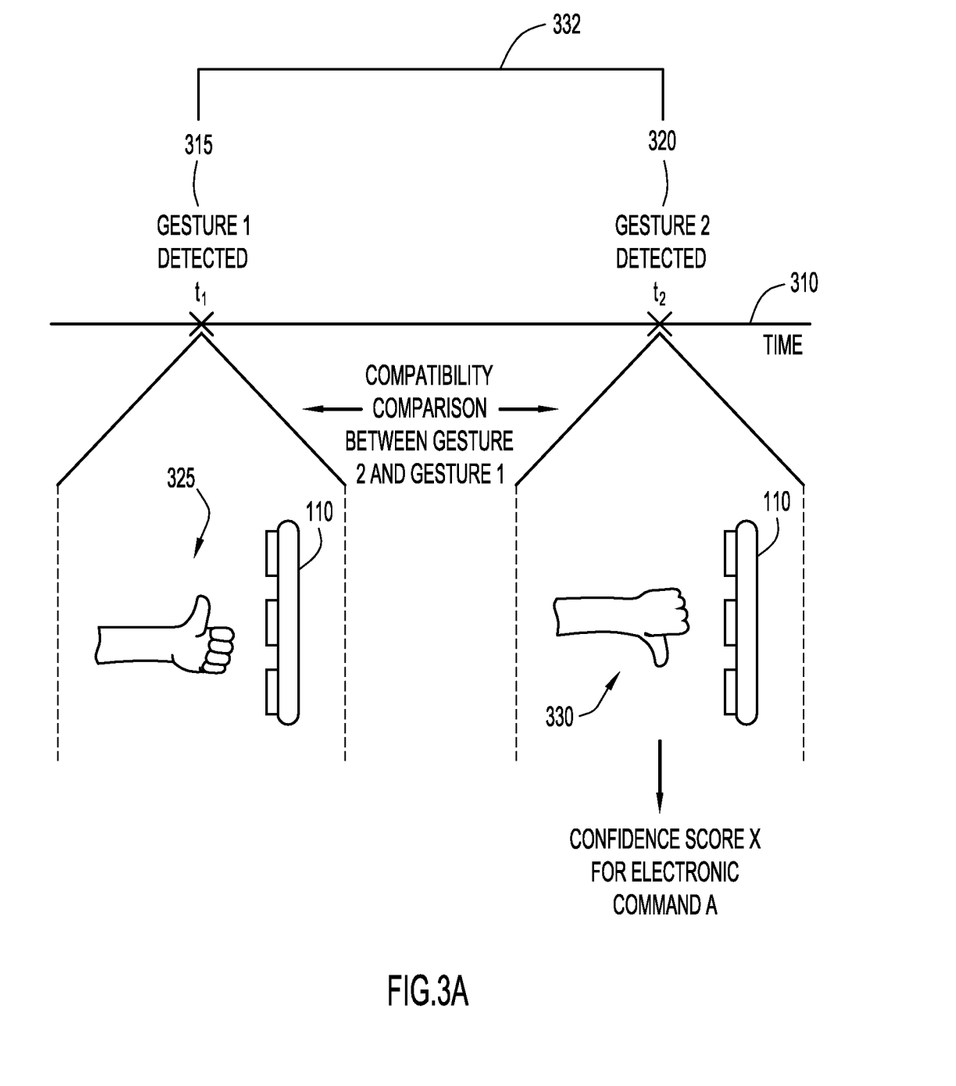
FIGS. 3A and 3B show example sequences of gestures with confidence scores associated with a detected gesture in the sequences.
Figure 3B:
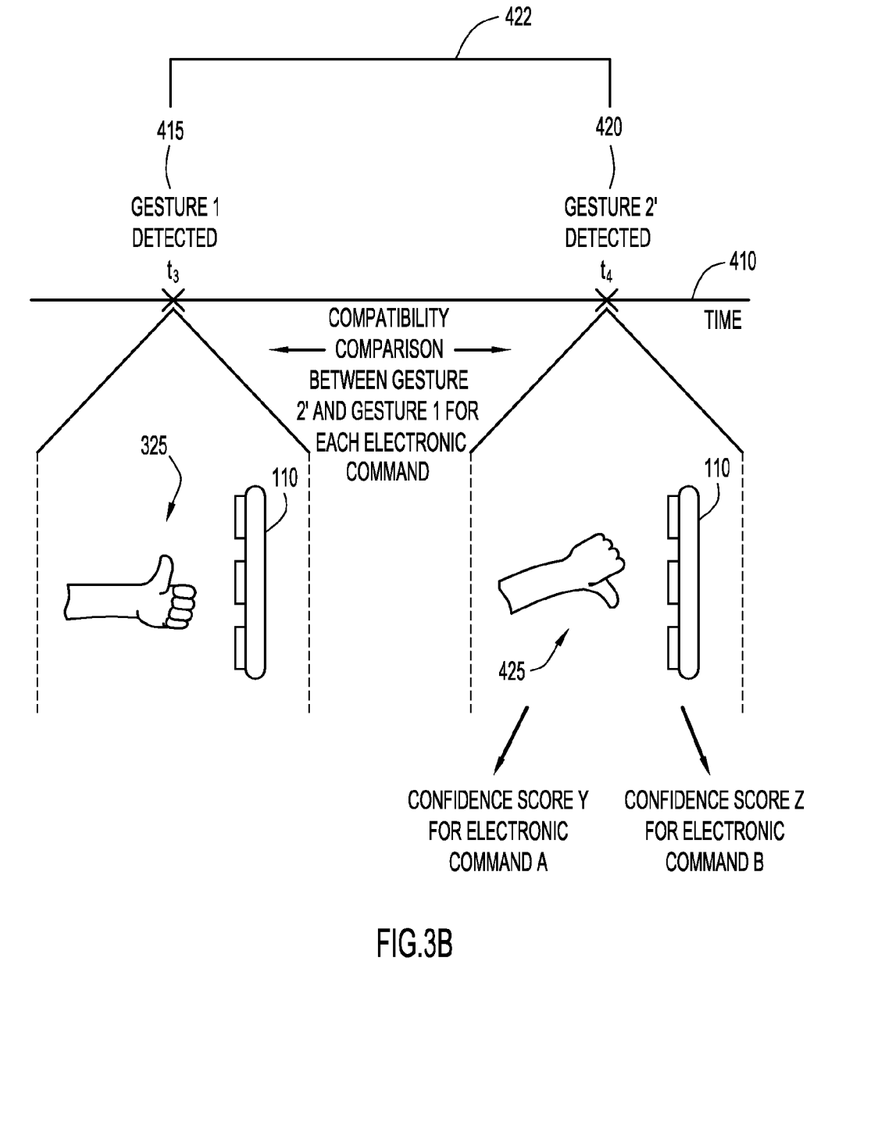

Reference is now made to FIGS. 3A and 3B which show examples of a series of detected gestures with associated electronic commands. In FIG. 3A, the gesture device 110 detects two gestures over a period of time 310. Gesture 1 is detected at a time $t_1$ (shown at reference numeral 315) by the gesture device 110, and Gesture 2 is detected at a time $t_2$ (shown at reference numeral 320). An example of Gesture 1 is shown at reference numeral 325 as the user 112 making a "thumbs up" motion near the gesture device 110. Gesture 2 is shown at reference numeral 330 as the user 112 making a "thumbs down" motion near the gesture device 110. It should be appreciated that Gesture 1 and Gesture 2 may be any type of motion in three-dimensional space made by the user 112 in near the gesture device 110, and that the "thumbs up" motion and the "thumbs down" motion are used as examples for simplicity.

In FIG. 3A, the gesture device 110 detects Gesture 2 after it detects Gesture 1. The time between Gesture 1 and Gesture 2 is measured as the time difference between $t_1$ and $t_2$ (shown at reference numeral 332). The time difference 332 may be measured, for example, by the timer unit 212 of the gesture device 110. It is assumed in FIG. 3A that the gesture device 110 has executed any appropriate electronic command (e.g., an electronic command with a sufficient or adequate confidence score) associated with Gesture 1 before Gesture 2 is detected.

As described above, when the gesture device 110 detects Gesture 2, the gesture device 110 assigns a confidence score for an electronic command believed to be associated with this gesture. FIG. 3A shows the gesture device 110 assigning confidence score "X" for an electronic command "A" believed to be associated with Gesture 2. After assigning the confidence score "X" to electronic command "A," the gesture device 110 performs a compatibility comparison between the electronic command associated with Gesture 1 (which, if any, has already been executed) and electronic command "A" to adjust the confidence score "X" of Gesture 2, as described by the techniques hereinafter. Also, in one example, the time difference 332 may determine the extent to which confidence score "X" should be adjusted.

In FIG. 3B, the gesture device 110 also detects two gestures over a period of time 410, similar to FIG. 3A. Gesture 1 is detected at a time $t_3$ (shown at reference numeral 415) by the gesture device 110, and Gesture 2' is detected at a time a later time $t_4$ (shown at reference numeral 420), and the time difference between detecting Gesture 1 and Gesture 2' is shown at reference numeral 422. Gesture 1 is shown at reference numeral 325 and, for example, is similar to Gesture 1 in FIG. 3A. Gesture 2' is shown at reference numeral 425. In FIG. 3B, it is also assumed that the gesture device 110 has executed an appropriate electronic command associated with Gesture 1 before Gesture 2' is detected. Upon detecting Gesture 2', the gesture device 110 may be unsure of the particular electronic command intended to be associated with the gesture. For example, as shown, the user 112 may make the Gesture 425 that resembles, but is not quite, the "thumbs down" gesture.

As a result, the gesture device 110 determines that Gesture 2' may be intended to trigger two possible electronic commands: electronic command "A" (associated with the "thumbs down" gesture) and electronic command "B" (associated with another similar gesture). The gesture device 110 then generates a confidence score for each of the electronic commands, as described above. As shown, the gesture device 110 generates confidence score "Y" for electronic command "A" and generates confidence score "Z" for electronic command "B." The gesture device 110 performs a compatibility comparison between the electronic command associated with Gesture 1 (which, if any, has already been executed) and both electronic command "A" and electronic command "B." Accordingly, each of the confidence scores "Y" and "Z," for respective electronic commands "A" and "B," may be adjusted by a compatibility metric based on this compatibility comparison. As with FIG. 3A above, the time difference 422 between Gesture 1 and Gesture 2' may also affect the adjustments of each of the confidence scores "Y" and "Z."

Figure 4:
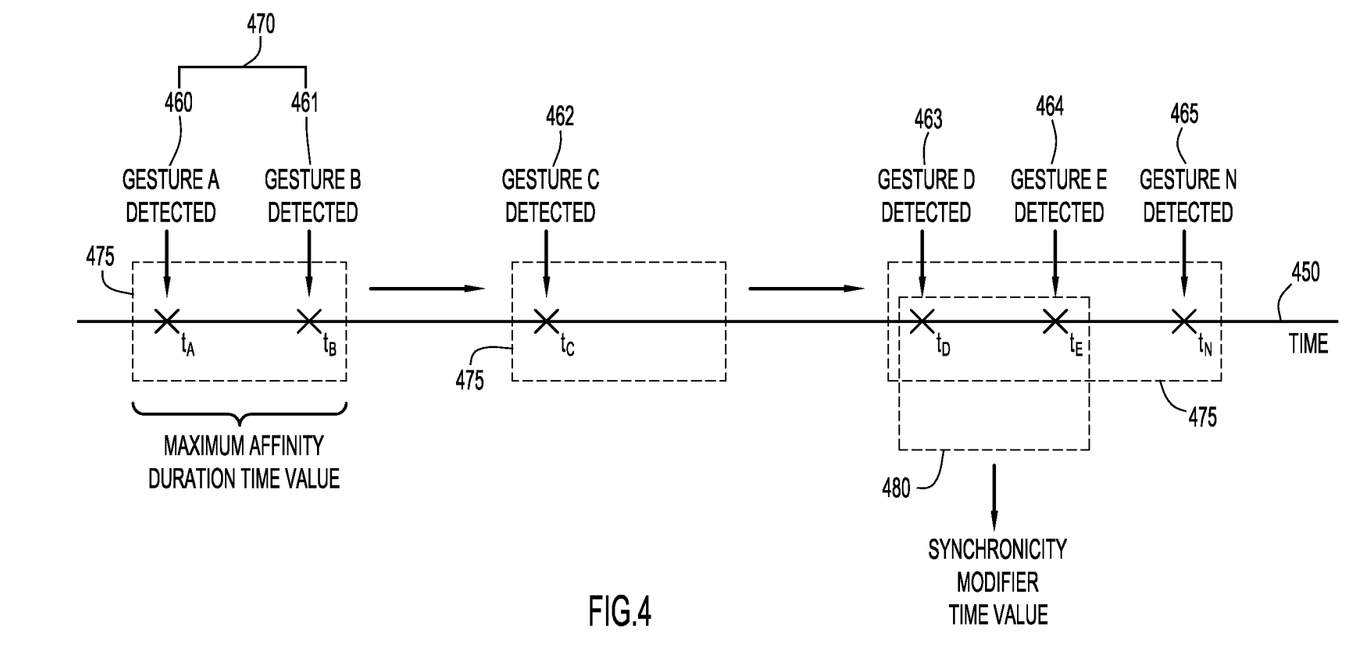
FIG. 4 shows an example time line for detecting a series of gestures.

Reference is now made to FIG. 4. FIG. 4 shows a series of gestures detected by the gesture device 110 over a period of time 450. These gestures are depicted as "Gesture A" to "Gesture N," and the gesture device 110 detects these gestures at time instances $t_A$-$t_N$, respectively, shown at reference numerals 460-465. As stated above in connection with FIG. 2, the timer unit 212 of the gesture device 110 is configured to measure the amount of time between gesture detection instances, also known as "time duration values." An example of a time duration value is shown at reference numeral 470, which shows the time between the gesture device 110 detecting Gesture A and Gesture B (e.g., between time instances 460 and 461). It should be appreciated that the timer unit 212 may measure time duration values between any gesture instances. In one example, a time duration value may be calculated between Gesture A and Gesture C, between Gesture B and Gesture C, and so on. In general, the time duration values are calculated between gesture instances where associated electronic commands (if any) have been executed by the gesture device 110 and new gesture instances where the gesture device 110 detects a gesture, but has not yet executed an associated electronic command.

FIG. 4 also shows sets of a predetermined time value (e.g., a maximum affinity duration (MAD) time value) at reference numeral 475. The MAD time value 475 is, for example, a predetermined time period in which gestures detected within the predetermined time period are eligible for the compatibility comparison techniques described herein. In one embodiment, when a time duration value between a current gesture and a previous gesture (e.g., a detected gesture of which the gesture device 110 has executed the corresponding electronic command) is less than the MAD time value 475, the current gesture is eligible for the compatibility comparison. The compatibility comparison, for example, compares the potential electronic commands of the current gesture with the electronic command executed in association with the previous gesture. In one example, the MAD time value 475 is measured in seconds or could be as long as needed depending on the context in which the gesture detection is occurring.

The MAD time value 475 is shown in FIG. 4 as a sliding time window that "runs" across the time period 450. In other words, the MAD time value 475 represents a window of time during which gestures are eligible for the compatibility comparison. As shown in FIG. 4, Gestures A and B are in a first MAD time window, Gesture C is in a second MAD time window and Gestures D, E and N are in a third MAD time window. Accordingly, in the first MAD time window, the gesture device 110 performs compatibility comparison operations between Gesture B and Gesture A. In the second MAD time window, the gesture device 110 does not perform any compatibility comparison (since no other gesture instance is detected in the second MAD time window), and in the third MAD time window, the gesture device 110 performs compatibility comparison operations between Gesture E and Gesture D, as well as between Gesture N and Gesture D. It is important to note that, according to one embodiment, in the third MAD time window, compatibility comparisons are performed between Gesture N and Gesture E only if the gesture device 110 has already executed an electronic command (if any) associated with Gesture E (e.g., the most recent previous gesture for which the gesture device 110 has executed an electronic command). Otherwise, the gesture device 110 performs the compatibility comparisons with respect to Gesture D, since Gesture D is the most recent previous gesture for which the gesture device 110 has executed an electronic command.

FIG. 4 also shows a synchronicity modifier time value 480. The synchronicity modifier time value is a measure of the time duration value between gesture instances within a MAD time window. For example, as shown in FIG. 4, the synchronicity modifier time value 480 represents the time duration value between Gesture D and Gesture E. Though not shown in FIG. 4, there are other synchronicity modifier time values between other gesture instances within other MAD time windows. In general, the synchronicity modifier time value 480 is the same time value as the time duration values between gesture instances, with the qualification that the synchronicity modifier time value 480 must occur within a MAD time window. For example, there is a time duration value between Gesture C and Gesture D, but there may be no synchronicity modifier time value 480 between Gesture C and Gesture D, since they are not in the same MAD time window. The synchronicity modifier time value 480 is a factor that the gesture device 110 uses to adjust the confidence score of current gestures, according to the techniques described hereinafter.

As stated above, when the gesture device 110 detects multiple gestures, the gesture device 110 can use information from previously detected gestures to adjust the confidence score of electronic commands associated with newly detected gestures. In one embodiment, the electronic commands associated with the newly detected gestures can undergo a compatibility comparison with previously executed electronic commands in order to determine whether the confidence scores of the electronic commands associated with the newly received gestures should be adjusted. For example, the gesture device 110 may know that an electronic command associated with a newly detected gesture (e.g., a command to power off the gesture device 110) is unlikely to be preceded by the electronic command, already executed by the gesture device 110, associated with a previously detected gesture (e.g., a command to increase a volume component of the gesture device 110). Likewise, the gesture device 110 may know that an electronic command with a newly detected gesture (e.g., a command to increase a volume component of the gesture device 110) is likely to be preceded by an electronic command associated with a previously detected gesture (e.g., a command to power on the gesture device 110).

Such compatibility comparisons, however, are not always desirable. For example, when a relatively long time passes between the gesture device 110 detecting gesture instances, the compatibility comparison between the electronic commands associated with these gesture instances may not be useful. As a result, in one embodiment, the gesture device 110 performs the compatibility comparison between the electronic commands only when subsequent gestures are detected within the predetermined time period of the MAD time value 475, described above. When these gestures are within the predetermined time period of the MAD time value 475, the gesture device 110 can adjust the confidence score of electronic commands associated with current/new gestures.

Figure 5:
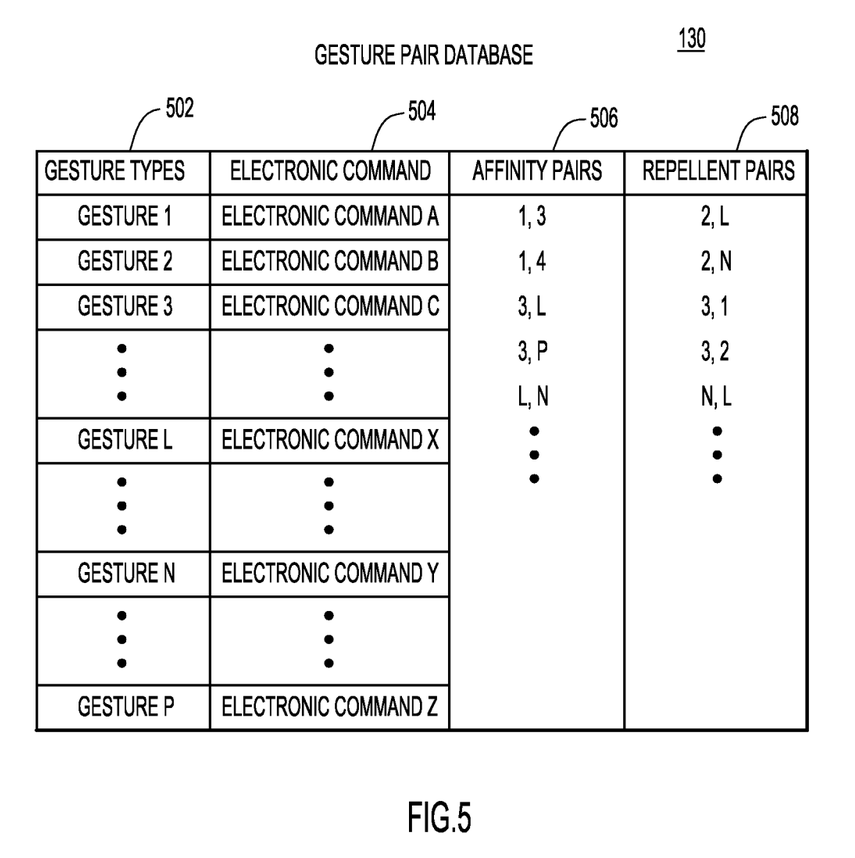
FIG. 5 shows an example of a gesture pair database showing examples of affinity gesture pairs and repellent gesture pairs.

Reference is now made to FIG. 5, which shows the gesture pair database 130. As stated above in connection with FIG. 1, the gesture device 110 is configured to access the gesture pair database 130, and in one example, the gesture pair database 130 may reside within the memory 220 of the gesture device 110. The gesture pair database 130 stores a list of gesture types 502 and corresponding electronic commands 504. The gesture pair database 130 also stores a list of "affinity" gesture pairs 506 and "repellent" gesture pairs 508. The list of gesture types 502 is shown as comprising Gesture 1 to Gesture P, and represents all types of gestures that the gesture device 110 is configured to detect. The list of electronic commands 504 is shown as comprising Electronic Command A to Electronic Command Z, and represents the electronic command associated with the gestures in list 502 and to be executed by the gesture device 110 when the gesture device 110 detects the associated gesture. For example, Gesture 1 may be a "thumbs up" gesture and Electronic Command A may be a "device on" command, Gesture 2 may be a "thumbs down" gesture and Electronic Command B may be a "device off" command, and so on.

The affinity pairs 506 represent a sequence of gestures with electronic commands that the gesture device 110 would expect or anticipate to be detected together, while the repellent pairs 508 represent a sequence of gestures with electronic commands that the gesture device 110 would expect or anticipate not to be detected in a sequence together. The affinity and repellent pairs 506 and 508 are listed in the order to be detected by the gesture device 110. For example, a pair designated as "L,N" represents a pair corresponding to the gesture device 110 detecting Gesture L and subsequently detecting Gesture N, while a pair designated as "N,L" represents a pair corresponding to the gesture device 110 detecting Gesture N and subsequently detecting Gesture L.

In one example, Gesture 1 may be a gesture corresponding to a "device on" electronic command, Gesture 2 may correspond to a "device off" electronic command, and Gesture 3 may be a gesture corresponding to a "volume up" electronic command. It should be appreciated that these gestures and commands are merely used as examples, for simplicity. As shown in FIG. 5, gesture pair "1,3" is an affinity pair, while gesture pairs "3,1" and "3,2" are repellent gesture pairs. As a result, the gesture pair database 130 indicates that a "device on" command is likely to be followed by a "volume up" command (i.e., affinity pair "1,3"). Likewise, the gesture pair database 130 indicates that a "volume up" command is unlikely to be followed by a "device on" command (i.e., repellent pair "3,1") and is also unlikely to be followed by a "device off" command (i.e., repellent pair "3,2"). The gesture device 110 can adjust the confidence score of the electronic command associated with the currently detected gesture accordingly.

For example, when the gesture device 110 detects a current gesture within the MAD time value 475 as a previous gesture, the gesture device 110 can perform the compatibility comparison between the current gesture and the previous gesture to determine whether the electronic command associated with the current gesture should be executed. For example, the gesture device 110 consults the gesture pair database 130 to adjust the confidence score of the electronic command associated with the current gesture based on whether the previous gesture and the current gesture (and corresponding electronic commands) are affinity pairs or repellent pairs. If the gestures are affinity pairs, the gesture device 110 may increase the confidence score of the electronic command associated with the current gesture by an amount enabling the confidence score to surpass the threshold confidence score value to execute the electronic command. If the gestures are repellent pairs, the gesture device 110 may decrease the confidence score of the electronic command to ensure that it remains below the threshold confidence score value.

The gesture device 110 may also adjust this confidence score by a scaling factor associated with the synchronicity modifier time value, described in connection with FIG. 4, above. For example, if the gesture pairs are detected relatively close in time (e.g., a relatively low synchronicity time value) within the MAD time window, the gesture device 110 may place higher importance or weight on the characterization of the gesture pairs as affinity pairs or repellent pairs. If the gesture pairs are detected relatively far apart in time (e.g., a relatively high synchronicity time value) within the MAD time window, the gesture device 110 may place lower importance or weight on the characterization of the gesture pairs. Thus, the confidence score of the electronic command associated with a current gesture may be adjusted by a compatibility metric based on its characterization as an affinity or repellent pair with respect to the previous gesture and also may be adjusted based on time value between detection instances of the current gesture and the previous gesture. This process can be repeated for other newly detected gesture instances.

In one example, the confidence score of an electronic command associated with a current gesture is calculated by the following formula:

$$FCS = OCS + SUM(AGPM[n]*GPSM[n]) - SUM(RGPM[m]*GPSM[m])$$

where the variables are defined as follows:

Final Confidence Score (FCS): The adjusted confidence score value of the electronic command associated with the current gesture, which will ultimately be compared to the threshold confidence score value;

Original Confidence Score (OCS): An original confidence score value of the electronic command provided by the gesture device 110 upon detection of the associated gesture;

Attractive Gesture Pair Modifier (AGPM): An arithmetic modifier (e.g., as a percent) that is subtracted from the OCS before it is compared to the threshold confidence score value;

Gesture Pair Synchronicity Modifier (GPSM): A geometric modifier based on how far ahead in time the current gesture was detected by the gesture device 110 relative to the previous gesture (e.g., GPSM has a value between zero and one, with zero representing the maximum affinity duration time period and one representing synchronous detection with the previously detected gesture).

In one example, the values of the MAD time value, AGPM, RGPM and GPSM may either be pre-set in the gesture device 110 (e.g., in memory 220) or set based on previous usage, for example, using a scheme like Bayesian probability.

Figure 6:
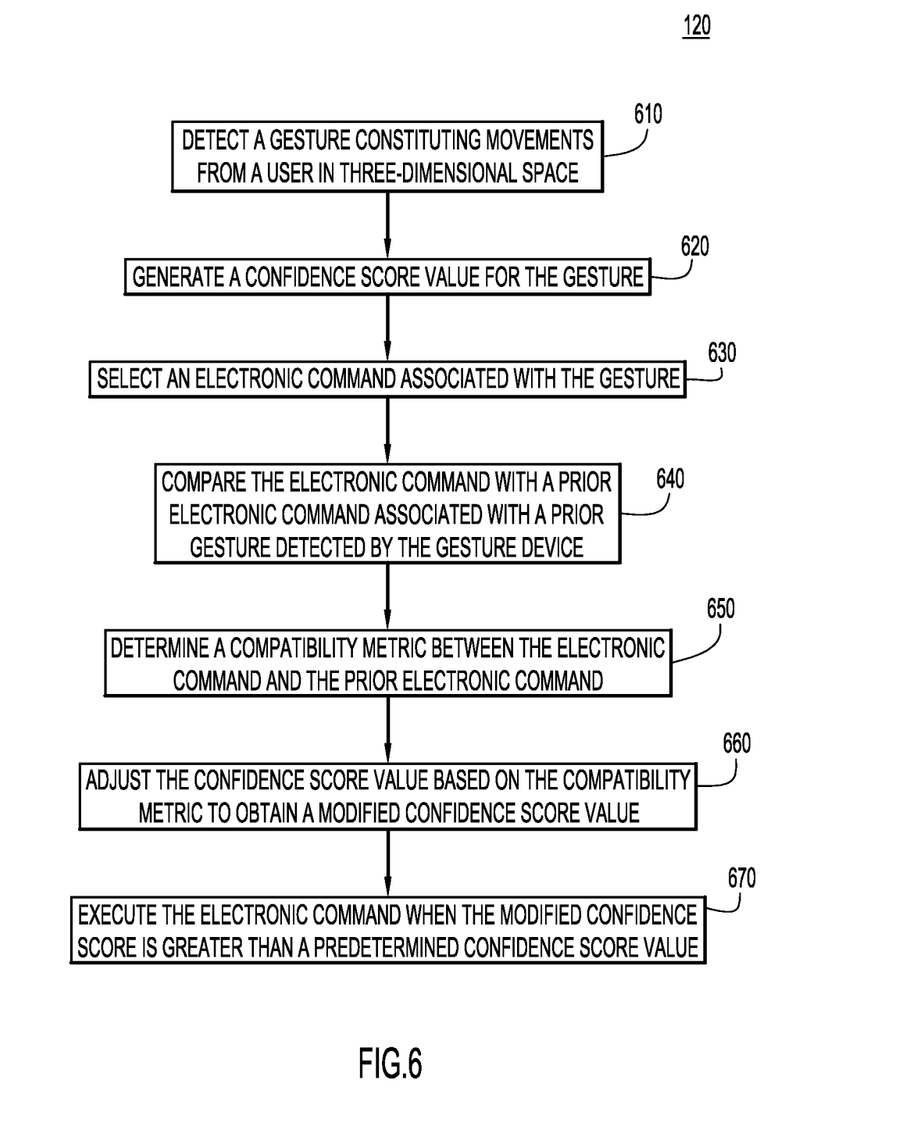
FIG. 6 shows an example flow chart depicting operations of the gesture detection and confidence score modification process logic to detect a series of gestures and adjust the confidence score associated with the gestures in order to execute the electronic command associated with the gestures.

Reference is now made to FIG. 6, which shows an example flow chart depicting operations of the gesture detection and confidence score modification process logic 120 to detect a series of gestures and adjust the confidence score associated with the gestures. The operations of FIG. 6 are, for example, executed by the processor 215 of the gesture device 110. In operation 610, the gesture device 110 detects a gesture constituting movements from a user in three-dimensional space. At operation 620, the gesture device generates a confidence score value for the gesture and, at 630, selects an electronic command associated with the gesture. At operation 640, the gesture device compares the electronic command with a prior electronic command associated with a prior gesture detected by the gesture device 110 and, at operation 650, determines a compatibility metric between the electronic command and the prior electronic command. At 660, the gesture device 110 adjusts the confidence score value based on the compatibility metric to obtain a modified confidence score value and, at 670, executes the electronic command when the modified confidence score is greater than a predetermined confidence score value.

Figure 7:
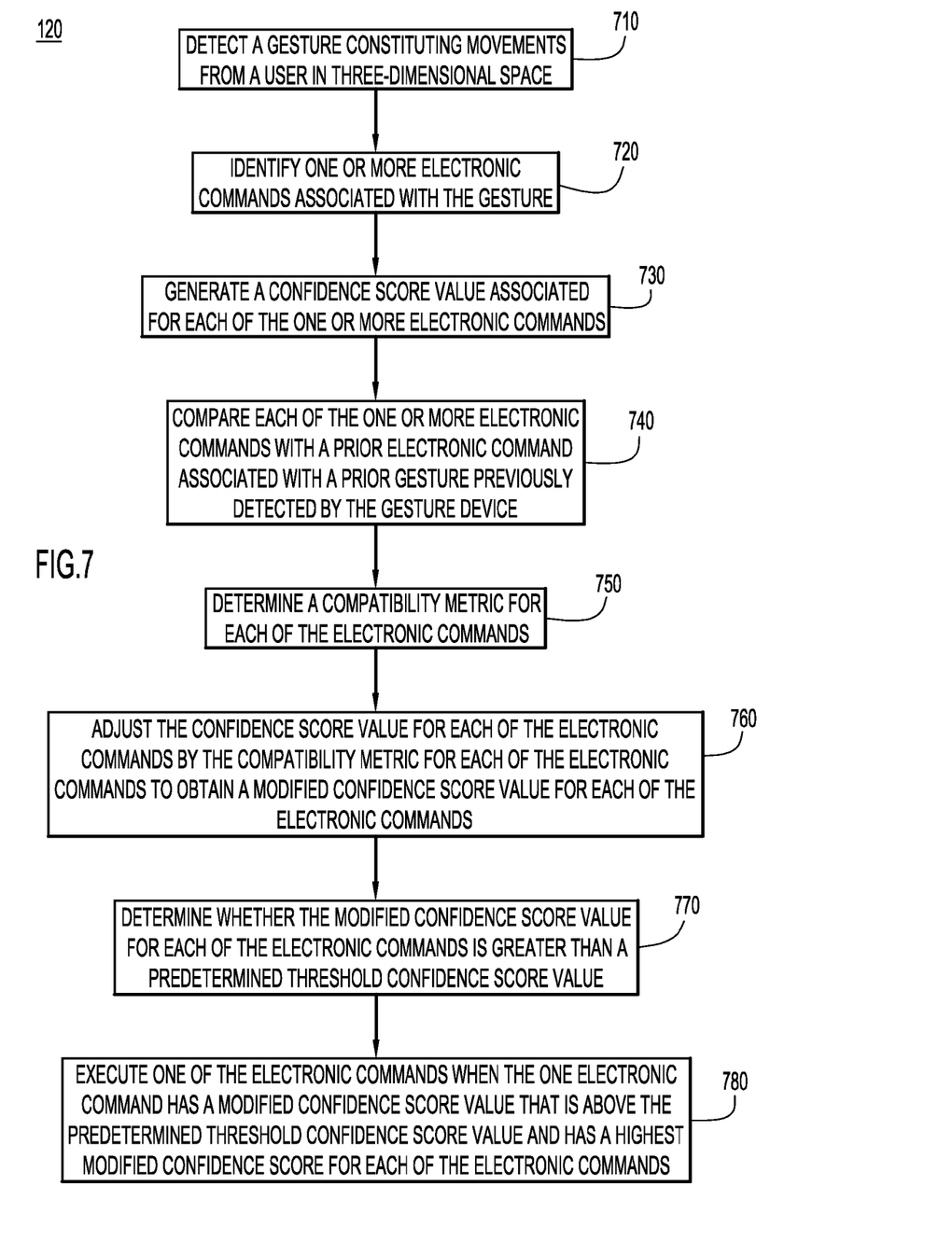
FIG. 7 shows an example flow chart depicting operations of the gesture detection and confidence score modification process logic to detect a series of gestures and to adjust multiple confidence scores associated with the gestures in order to execute an appropriate electronic command.

Reference is now made to FIG. 7, which shows an example flow chart depicting operations of the gesture detection and confidence score modification process logic 120 to detect a series of gestures and to adjust multiple confidence scores associated with the gestures. The operations in FIG. 7 may be performed by the processor 215 of the gesture device 110. At operation 710, the gesture device detects a gesture constituting movements from a user in three-dimensional space and, at 720, identifies one or more electronic commands associated with the gesture. At 730, the gesture device 110 generates a confidence score value associated for each of the one or more electronic commands. The gesture device 110, at 740, compares each of the one or more electronic commands with a prior electronic command associated with a prior gesture previously detected by the gesture device 110. At 750, the gesture device 110 determines a compatibility metric for each of the electronic commands and, at 760, adjusts the confidence score value for each of the electronic commands by the compatibility metric for each of the electronic commands to obtain a modified confidence score value for each of the electronic commands. The gesture device, at 770, determines whether the modified confidence score value for each of the electronic commands is greater than a predetermined threshold. At 780, the gesture device executes one of the electronic commands when the one electronic command has a modified confidence score value that is above the predetermined confidence score value and has a highest modified confidence score value of the modified confidence score for each of the electronic commands.

It should be appreciated that the techniques described above in connection with all embodiments may be performed by one or more computer readable storage media that is encoded with software comprising computer executable instructions to perform the methods and steps described herein.

In sum, a method is provided comprising: at a gesture device, detecting a gesture constituting movements from a user in three-dimensional space; identifying a possible electronic command associated with the gesture; generating a confidence score value for the electronic command associated with the gesture; comparing the electronic command associated with the gesture with a prior electronic command associated with a prior gesture previously detected by the gesture device to determine a compatibility metric between the electronic command and the prior electronic command; adjusting the confidence score value based on the compatibility metric to obtain a modified confidence score value; and executing the electronic command when the modified confidence score value is greater than a predetermined threshold confidence score value.

In addition, a method is provided comprising: at a gesture device, detecting a gesture constituting movements from a user in three-dimensional space; identifying one or more possible electronic commands associated with the gesture; generating a confidence score value associated for each of the one or more electronic commands; comparing each of the one or more electronic commands with a prior electronic command associated with a prior gesture previously detected by the gesture device to determine a compatibility metric for each of the electronic commands; adjusting the confidence score value for each of the electronic commands by the compatibility metric for each of the electronic commands to obtain a modified confidence score value for each of the electronic commands; determining whether the modified confidence score value for each of the electronic commands is greater than a predetermined threshold confidence score value; and executing one of the electronic commands when the one electronic command has a modified confidence score value that is above the predetermined threshold confidence score value and has a highest modified confidence score value of the modified confidence score for each of the electronic commands.

Furthermore, one or more computer readable storage media is provided that is encoded with software comprising computer executable instructions and when the software is executed operable to: detect a gesture constituting movements from a user in three-dimensional space; identify a possible electronic command associated with the gesture; generate a confidence score value for the electronic command associated with the gesture; compare the electronic command associated with the gesture with a prior electronic command associated with a prior gesture previously detected by the gesture device to determine a compatibility metric between the electronic command and the prior electronic command; adjust the confidence score value based on the compatibility metric to obtain a modified confidence score value; and execute the electronic command when the modified confidence score value is greater than a predetermined threshold confidence score value.

In addition, one or more computer readable storage media is provided that is encoded with software comprising computer executable instructions and when the software is executed operable to: detect a gesture constituting movements from a user in three-dimensional space; identify one or more electronic commands associated with the gesture; generate a confidence score value associated for each of the one or more possible electronic commands; compare each of the one or more electronic commands with a prior electronic command associated with a prior gesture previously detected to determine a compatibility metric for each of the electronic commands; adjust the confidence score value for each of the electronic commands by the compatibility metric for each of the electronic commands to obtain a modified confidence score value for each of the electronic commands; determine whether the modified confidence score value for each of the electronic commands is greater than a predetermined threshold confidence score value; and execute one of the electronic commands when the one electronic command has a modified confidence score value that is above the predetermined threshold confidence score value and has a highest modified confidence score value of the modified confidence score for each of the electronic commands.

Additionally, an apparatus is provided comprising: a sensor array unit configured to detect a gesture constituting movements from a user in three-dimensional space; a memory; and a processor coupled to the sensor array unit and the memory, and configured to: receive data for the gesture from the sensor array unit; identify a possible electronic command associated with the gesture; generate a confidence score value for the electronic command associated with the gesture; compare the electronic command associated with the gesture with a prior electronic command associated with a prior gesture previously detected to determine a compatibility metric between the electronic command and the prior electronic command; adjust the confidence score value based on the compatibility metric to obtain a modified confidence score value; and execute the electronic command when the modified confidence score value is greater than a predetermined threshold confidence score value.

The above description is intended by way of example only. Various modifications and structural changes may be made therein without departing from the scope of the concepts described herein and within the scope and range of equivalents of the claims.

What is claimed is:

1. A method comprising:
   at a gesture device, detecting a gesture constituting movements from a user in three-dimensional space;
   identifying a possible electronic command associated with the gesture;
   generating a confidence score value for the electronic command associated with the gesture;
   comparing the electronic command associated with the gesture with a prior electronic command associated with a prior gesture previously detected by the gesture device to determine a compatibility metric between the electronic command and the prior electronic command;
   adjusting the confidence score value based on the compatibility metric to obtain a modified confidence score value; and
   executing the electronic command when the modified confidence score value is greater than a predetermined threshold confidence score value.

2. The method of claim 1, further comprising:
   determining a time duration value between the gesture device detecting the gesture and the gesture device detecting the prior gesture;
   determining whether the time duration value is less than a predetermined time duration value; and
   performing the comparing, adjusting and executing operations when the time duration value is less than the predetermined time duration value.

3. The method of claim 2, wherein adjusting comprises adjusting the confidence score value by a scaling factor based on the time duration value.

4. The method of claim 1, wherein comparing the electronic command with the prior electronic command comprises:
   accessing a database comprising a list of designated affinity gesture pairs and a list of designated repellent gesture pairs; and
   determining whether the electronic command and the prior electronic command are affinity gesture pairs or repellent gesture pairs based on the list of designated affinity gesture pairs and the list of designated repellent gesture pairs.

5. The method of claim 1, further comprising:
   assigning a first value for the compatibility metric to increase the confidence score by the first value when the electronic command and the prior electronic command are affinity gesture pairs; and
   assigning a second value for the compatibility metric to decrease the confidence score value by the second value when the electronic command and the prior electronic command are repellent gesture pairs.

6. The method of claim 1, wherein adjusting comprises obtaining the modified confidence score value according to the formula:

$$FCS=OCS+SUM(AGPM[n]*GPSM[n])-SUM(RGPM[m]*GPSM[m]),$$

wherein FCS is a final confidence score, OCS is an original confidence score, AGPM is an affinity gesture pair modifier, RGPM is a repellent gesture pair modifier, and GPSM is a gesture pair synchronicity modifier that operates as a scaling factor based on how close in time the gesture and the prior gesture are detected.

7. The method of claim 1, further comprising:
   detecting a new gesture after detecting the gesture and the prior gesture;
   generating a new confidence score value for the new gesture;
   selecting a new electronic command associated with the new gesture;
   comparing the new electronic command with the prior electronic command to determine a new compatibility metric between the new electronic command and a most recent electronic command associated with a most recent previous gesture;
   adjusting the new confidence score value based on the new compatibility metric to obtain a new modified confidence score value; and
   executing the new electronic command when the new modified confidence score value is greater than the predetermined threshold confidence value.

8. A method comprising:
   at a gesture device, detecting a gesture constituting movements from a user in three-dimensional space;
   identifying one or more electronic commands associated with the gesture;
   generating a confidence score value associated for each of the one or more electronic commands;
   comparing each of the one or more electronic commands with a prior electronic command associated with a prior gesture previously detected by the gesture device to determine a compatibility metric for each of the electronic commands;
   adjusting the confidence score value for each of the electronic commands by the compatibility metric for each of the electronic commands to obtain a modified confidence score value for each of the electronic commands;
   determining whether the modified confidence score value for each of the electronic commands is greater than a predetermined threshold confidence score value; and
   executing one of the electronic commands when the one electronic command has a modified confidence score value that is above the predetermined threshold confidence score value and has a highest modified confidence score value of the modified confidence score for each of the electronic commands.

9. The method of claim 8, wherein adjusting comprises obtaining the modified confidence score value for each of the electronic commands according to the formula:

$$FCS=OCS+SUM(AGPM[n]*GPSM[n])-SUM(RGPM[m]*GPSM[m]),$$

wherein FCS is a final confidence score, OCS is an original confidence score, AGPM is an affinity gesture pair modifier, RGPM is a repellent gesture pair modifier, and GPSM is a gesture pair synchronicity modifier that operates as a scaling factor based on how close in time the gesture and the prior gesture are detected.

10. An apparatus comprising:
    a sensor array unit configured to detect a gesture constituting movements from a user in three-dimensional space;
    a memory; and
    a processor coupled to the sensor array unit and the memory, and configured to:

receive data for the gesture from the sensor array unit;
identify a possible electronic command associated with the gesture;
generate a confidence score value for the electronic command associated with the gesture;
compare the electronic command associated with the gesture with a prior electronic command associated with a prior gesture previously detected to determine a compatibility metric between the electronic command and the prior electronic command;
adjust the confidence score value based on the compatibility metric to obtain a modified confidence score value; and
execute the electronic command when the modified confidence score value is greater than a predetermined threshold confidence score value.

11. The apparatus of claim 10, wherein the processor is further configured to:
determine a time duration value between detecting the gesture and detecting the prior gesture;
determine whether the time duration value is less than a predetermined time duration value; and
perform the comparing, adjusting and executing operations when the time duration value is less than the predetermined time duration value.

12. The apparatus of claim 11, wherein the processor is further configured to adjust the confidence score value by a scaling factor based on the time duration value.

13. The apparatus of claim 10, wherein the processor is further configured to:
access a database comprising a list of designated affinity gesture pairs and a list of designated repellent gesture pairs; and
determine whether the electronic command and the prior electronic command are affinity gesture pairs or repellent gesture pairs based on the list of designated affinity gesture pairs and the list of designated repellent gesture pairs.

14. The apparatus of claim 10, wherein the processor is further configured to:
assign a first value for the compatibility metric to increase the confidence score by the first value when the electronic command and the prior electronic command are affinity gesture pairs; and
assign a second value for the compatibility metric to decrease the confidence score value by the second value when the electronic command and the prior electronic command are repellent gesture pairs.

15. The apparatus of claim 10, wherein the processor is further configured to obtain the modified confidence score value according to the formula:

$$FCS=OCS+SUM(AGPM[n]*GPSM[n])-SUM(RGPM[m]*GPSM[m]),$$

wherein FCS is a final confidence score, OCS is an original confidence score, AGPM is an affinity gesture pair modifier, RGPM is a repellent gesture pair modifier, and GPSM is a gesture pair synchronicity modifier that operates as a scaling factor based on how close in time the gesture and the prior gesture are detected.

16. The apparatus of claim 10, wherein the processor is further configured to:
detect a new gesture after detecting the gesture and the prior gesture;
generate a new confidence score value for the new gesture;
select a new electronic command associated with the new gesture;
compare the new electronic command with the prior electronic command to determine a new compatibility metric between the new electronic command and a most recent electronic command associated with a most recent previous gesture;
adjust the new confidence score value based on the new compatibility metric to obtain a new modified confidence score value; and
execute the new electronic command when the new modified confidence score value is greater than the predetermined threshold confidence value.

17. The apparatus of claim 10, wherein the processor is further configured to:
identify one or more electronic commands associated with the gesture;
generate one or more confidence score values associated for each of the one or more electronic commands;
compare each of the one or more electronic commands with the prior electronic command;
adjust the confidence score values for each of the electronic commands to obtain one or more modified confidence score values for each of the electronic commands;
determine whether the modified confidence score values for each of the electronic commands is greater than a predetermined threshold confidence score value; and
execute one of the electronic commands when the one electronic command has one of the modified confidence score values that is above the predetermined threshold confidence score value and has a highest one of the modified confidence score values for each of the electronic commands.

18. The apparatus of claim 10, wherein the sensor array unit is configured to detect a new gesture after detecting the gesture and detecting the prior gesture and wherein the processor is further configured to:
receive data for the new gesture from the sensor array unit;
identify a new possible electronic command associated with the new gesture;
generate a new confidence score value for the new electronic command associated with the new gesture;
compare the new electronic command associated with the gesture with the electronic command associated with the gesture and with the prior electronic command associated with the prior gesture to determine a new compatibility metric between the new electronic command, the electronic command and the prior electronic command;
adjust the confidence score value based on the new compatibility metric to obtain a new modified confidence score value; and
execute the new electronic command when the new modified confidence score value is greater than the predetermined threshold value.

19. The apparatus of claim 18, wherein the processor is further configured to:
determine a new time duration value between detecting the new gesture and detecting the gesture and the prior gesture;
determine whether the new time duration value is less than the predetermined time duration value; and
perform the comparing, adjusting and executing operations for the new electronic command when the new time duration value is less than the predetermined time duration value.

20. The apparatus of claim 19, wherein the processor is further configured to adjust the new confidence score value by a new scaling factor based on the new time duration value.

* * * * *